United States Patent
Benson (10) Patent No.: US 10,072,525 B2
(45) Date of Patent: Sep. 11, 2018

(54) GAS TURBINE ENGINE (71) Applicant: ROLLS-ROYCE PLC, London (GB)

(72) Inventor: Christopher Benson, Derby (GB)

(73) Assignee: ROLLS-ROYCE plc, London (GB)

( * ) Notice: Subject to any disclaimer, the term of this patent is extended or adjusted under 35 U.S.C. 154(b) by 358 days.

(21) Appl. No.: 14/831,270

(22) Filed: Aug. 20, 2015

(65) Prior Publication Data
US 2016/0076402 A1 Mar. 17, 2016

(30) Foreign Application Priority Data
Sep. 16, 2014 (GB) .................................. 1416336.4

(51) Int. Cl.
F01D 25/28 (2006.01)
F01D 25/24 (2006.01)
F16B 11/00 (2006.01)

(52) U.S. Cl.
CPC ............. *F01D 25/28* (2013.01); *F01D 25/24* (2013.01); *F01D 25/246* (2013.01); *F16B 11/006* (2013.01); *F05D 2220/32* (2013.01); *F05D 2230/70* (2013.01); *F05D 2260/32* (2013.01); *F05D 2260/407* (2013.01)

(58) Field of Classification Search
CPC ........ F01D 25/28; F01D 25/24; F01D 25/246; F16B 11/006; F05D 2260/407; F05D 2260/32; F05D 2230/70; F05D 2220/32
See application file for complete search history.

(56) References Cited

U.S. PATENT DOCUMENTS

| | | | | |
|---|---|---|---|---|
| 3,719,543 A * | 3/1973 | Harris | ...................... | B01J 19/10 156/73.1 |
| 4,248,232 A * | 2/1981 | Engelbrecht | ............. | A61N 7/00 156/754 |
| 5,662,757 A * | 9/1997 | Langenbrunner | ....... | F01D 11/12 156/298 |
| 6,558,493 B1 * | 5/2003 | Ledger | ...................... | B26F 3/00 156/712 |
| 7,507,312 B2 * | 3/2009 | Bossi | ................. | B23K 26/0069 156/712 |
| 2003/0127174 A1 * | 7/2003 | Essig | ..................... | B29C 65/76 156/73.6 |

(Continued)

FOREIGN PATENT DOCUMENTS

| EP | 2014734 A1 | 1/2009 |
|---|---|---|
| GB | 1357066 A | 6/1974 |
| WO | 2010/073169 A1 | 7/2010 |

OTHER PUBLICATIONS

Feb. 10, 2016 Search Report issued in European Patent Application No. 15181323.

(Continued)

*Primary Examiner* — Dwayne J White
*Assistant Examiner* — Adam W Brown
(74) *Attorney, Agent, or Firm* — Oliff PLC (57) ABSTRACT

A gas turbine engine comprising a casing, a bonding patch (10, 22) bonded to a surface of the casing, and a liner attached to the bonding patch. The bonding patch (10, 22) comprising a bonding region (12) configured to receive an adhesive for bonding the patch (10, 22) to a surface. A plurality of de-bonding elements (16) is configured to be movable relative to the bonding region (12) in response to an energizing signal.

15 Claims, 7 Drawing Sheets

(56) References Cited

U.S. PATENT DOCUMENTS

2011/0061767 A1* 3/2011 Vontell .................. F01D 25/285
144/195.7
2015/0023780 A1* 1/2015 Costa ...................... F01D 11/18
415/119

OTHER PUBLICATIONS

Sep. 28, 2015 Search Report in Great Britain Patent Application No. 1514622.8.
Dec. 19, 2014 Search Report issued in Great Britain Patent Application No. 1416336.4.

* cited by examiner

GAS TURBINE ENGINE

FIELD OF THE INVENTION

The present invention relates to a bonding patch which is de-bondable from a surface in response to the application of an energising signal such as a sound wave or an electrical signal; in particular, but not exclusively, to a bonding patch for bonding a liner (e.g. fan track liner) to a case (e.g. fan case) of a gas turbine engine.

BACKGROUND OF THE INVENTION

Typically, in gas turbine engines the impact or fan track liners have been bonded on to the fan case of the engine. In the past, this has been done in a large oven using a hot curing adhesive. Advantageously, bonding is a simple solution requiring minimal part count, minimal additional features on the case and is a relatively well understood process.

However, removal of the bonded liners from the case is not trivial. Removal of the liners may be necessary for repair/replacement reasons. In the past it has been proposed that sections of the liners can be cut and chiseled out to expose the bare case surface. The fan case surface can then be prepared using e.g. abrasive blasting so that a replacement liner section can be bonded to the exposed surface, e.g. using a cold curing adhesive, to fill the void.

However, such repair procedures are both difficult to perform and to control accurately. For example, the length of time it takes to perform the procedure, e.g. 30-40 hours, often means that the engine is removed so that the repair is performed off wing. This is a significant disruption if unscheduled.

There is also a chance of accidental tool damage to the case. This is a potentially more significant issue for a composite fan case.

Bolted liners have been proposed as an alternative solution. Bolted liners are relatively easy to replace, and therefore the processing time is less disruptive. However, using bolted liners introduces extra complexity and parts, e.g. nuts, bolts etc., and typically requires the case to be formed to include additional features to cooperate with the bolt-on liners to allow them to be mounted thereon. For example, mounting elements e.g. internal flanges are often required, and these structures can be difficult to incorporate into a composite fan case, for example.

SUMMARY OF THE INVENTION

Accordingly, in a first aspect there is provided a bonding patch as set forth in claim 1. Movement of the de-bonding elements relative to the bonding region facilitates de-bonding of the patch from the surface to which it is bonded, principally by (e.g. structurally) degrading the adhesive providing the bond (bond line) between the patch and the surface to which it is bonded.

The bonding region may be at least partially defined by a floor region of the patch.

Accordingly, in an embodiment, herein is described an (ultra)sonically excitable bonding patch suitable for mounting to a fan case liner panel that facilitates easy and clean de-bonding and removal of the liner panel from the fan case by breaking up the bond (provided by the adhesive used to bond the patch the fan case) when exposed to (ultra)sonic energy of one or more suitable frequencies.

In a particular embodiment, the bonding patch is coupled to a fan track liner panel and is bonded to a fan casing, for example, effectively to attach the fan track liner to the fan casing. When it is necessary to detach the fan track liner from the fan casing, the bonding patch can be energised, e.g. at ultrasonic frequencies, to cause the de-bonding elements to move in the bonding region, thereby weakening the adhesive and allowing the bonding patch to be de-bonded from the fan casing and consequently allowing the fan track liner to be detached from fan casing cleanly and efficiently.

Advantageously, a bonding patch according to the first aspect requires no modification of the surface to which it is bonded by the adhesive.

The cladding element which is attached to the bonding patch (e.g. the fan track liner) may be modified for example by including a recess for receiving the bonding patch.

The de-bonding elements may be configured to be movable relative to the bonding region in response to the energising signal, e.g. at (ultra)sonic frequencies, to degrade the effectiveness of the adhesive. For example, to weaken the structural bond provided by the adhesive. In embodiments, an epoxy film adhesive is used, but the inventive concept is applicable to any adhesive. For example, the adhesive may be a polymeric adhesive, such as a resin, a paste or a foaming type adhesive.

In all embodiments, the movement of the de-bonding elements may cause the structural integrity of the adhesive to be reduced. For example, the adhesive may be caused to fracture, crack and/or break up. However, in embodiments, the adhesive itself may not be structurally compromised in the sense that it is fractured, cracked and/or broken up, it is sufficient for example that the bond line between the adhesive and the patch is itself broken (or sufficiently compromised and degraded) to allow for the patch to be removed.

The de-bonding elements may be configured to be movable to break the bond provided by the adhesive between the patch and the surface to which it is bonded.

The de-bonding elements may be configured to vibrate in response to the energising signal. Thus, at least a component of the movement of the de-bonding elements is vibration. The extreme ends of each de-bonding element may not move when the de-bonding element vibrates. This can be achieved by the application of a suitable energising signal to the respective de-bonding elements. For example, by ensuring that the length (height) of e.g. a column type de-bonding element is a multiple of a one half wavelength of the applied sound wave.

However, in certain embodiments the end of the de-bonding element, e.g. provided in the form of a column, which is distal to the floor of the bonding patch may be movable. Such a distal end of the de-bonding element may be the portion of the de-bonding element which moves at a maximum, for example. This can be achieved, for example, if the length (height) of e.g. a column type de-bonding element is an odd multiple of a one quarter wavelength of the applied sound wave.

The de-bonding elements may be configured to be movable relative to the bonding region in response to an energising signal in the ultrasonic frequency range. The de-bonding elements may be movable in response to an ultrasonic energising signal in the range of 15 kHz to 100 kHz or in the range of 20 kHz to 40 kHz. Based on the choice of adhesive and the specific structure of bonding patch, and in particular of de-bonding elements, the skilled person is able to select the appropriate frequency range.

The bonding patch may include a first group of de-bonding elements and a respective second group of de-bonding elements, wherein the de-bonding elements of the first group are configured to move resonantly in response to a first energising signal of a first frequency, and wherein the de-bonding elements of the second group are configured to move resonantly in response to a second energising signal at a respectively different second frequency. Advantageously, this means that accidental exposure of all the de-bonding elements to an energising signal of only one of the first and second frequencies cannot result in unwanted (accidental) de-bonding of the entire bonding patch.

The de-bonding elements may be configured as an array projecting into the bonding region.

The de-bonding elements may be configured as an array of mutually spaced apart fingers projecting into the bonding region.

The de-bonding elements may be configured as an array of dimples formed in the floor of the bonding patch to be thinner than the surrounding region of the floor, and to be movable relative to (e.g. into) the bonding region in response to the energising signal.

Thus the energising signal(s) may be a sound wave(s). The sound wave(s) may be applied to the bonding patch via a suitable transducer for example. The transducer may be applied to the bonding patch manually for example. The sound wave(s) generated in the bonding patch induce movement, e.g. vibration, in the de-bonding elements. The sound wave(s) may induce resonant movement, e.g. vibration, in the de-bonding elements.

The de-bonding elements may include one or more transducers arranged to move the de-bonding elements relative to the bonding region in response to the supply of the energising signal. The one or more transducers may include one or more piezoelectric transducers configured to be supplied with an electrical signal which is suitable for causing the one or more piezoelectric transducers to move, e.g. vibrate. Thus, the energising signal may be a suitable electrical signal. Each energising signal of a plurality of energising signals may be a respective electrical signal, or may be a respective component of a mixed signal.

One or more respective transducers may be provided for each of the first and second groups of de-bonding elements. Each de-bonding element may include a respective transducer. Accordingly, the transducer(s) provided in the first group of de-bonding elements may be suppliable with the first energising (electrical) signal via a first set of electrical contacts, and the transducer(s) provided in the second group of de-bonding elements may be suppliable with the second energising (electrical) signal via a respective second set of electrical contacts.

The bonding region may be at least partially defined by a floor of the patch. The de-bonding elements may project from the floor into the bonding region. Where the de-bonding elements include transducers, such as piezoelectric transducers, the transducers may be formed in or on the floor of the patch.

The bonding patch may be provided with adhesive in the bonding region. The bonding patch may be bonded by the adhesive to a surface of a gas turbine engine. In particular, the bonding patch may be bonded to a fan case of a gas turbine engine. The bonding patch may also be attached to a liner panel lining the fan case. The liner panel may be a fan track liner.

The movement of the de-bonding elements relative to the bonding region may break the bond line (at the interface between the bonding patch and the adhesive).

In a second aspect there is provided a gas turbine engine comprising a case (e.g. a fan case) providing the surface to which the bonding patch herein described is bonded by the adhesive. A cladding member (or liner), for example a fan track liner, may be attached to the bonding patch to be bonded to the casing thereby. The cladding member (or liner) may be provided as single annular liner or may comprise a plurality of panels arranged to form the liner (e.g. circumferentially adjacent panels arranged to form an annular liner).

In a third aspect there is provided a method of de-bonding a bonding patch from a surface, the bonding patch including a bonding region containing an adhesive bonding the patch to a surface, and a plurality of de-bonding elements configured to be movable relative to the bonding region in response to an energising signal, the method including the steps of: applying the energising signal to the bonding patch to move the movable de-bonding elements relative to the bonding region (thereby reducing the effectiveness of the adhesive); and removing the bonding patch from the surface.

Advantageously, breaking the adhesive bond between the bonding patch and the surface to which it bonds in this way facilitates easy detachment (removal) of the bonding patch from the surface. Accordingly, any cladding body, such as a fan track liner or impact liner, which is attached to the (intermediary) bonding patch is easily de-coupled from the surface to which the bonding patch was bonded.

The method may include the step of vibrating the de-bonding elements by applying the energising signal.

For example, the step of applying the energising signal to the bonding patch may result in vibration of the movable de-bonding elements. Thus, at least a component of the movement of the de-bonding elements is vibration. In particular, the frequency of vibration of the de-bonding elements in response to the application of the energising signal corresponds to the frequency of the energising signal. The frequency of vibration may match the frequency of the energising signal.

The step of applying the energising signal to the bonding patch may include a step of generating a sound wave in the bonding patch. The step of applying the energising signal to the bonding patch may include the step of generating an ultrasonic sound wave in the bonding patch. Where the ultrasonic sound wave is generated to have a particular principal frequency, then the de-bonding elements may vibrate at the same principal frequency.

The method may include the steps of: applying a first energising signal to the bonding patch at a first frequency to move a first group of the de-bonding elements, and applying a respective second energising signal to the bonding patch at a respective second frequency to move a respective second group of the de-bonding elements. The movement may be a vibration. The frequency of vibration may correspond to the frequency of the respective energising signal.

The method may include the steps of applying the first energising signal to the bonding patch at the first frequency to move resonantly the de-bonding elements of the first group; and applying the second energising signal to the bonding patch at the second frequency to move resonantly the de-bonding elements of the second group.

At least a component of the resonant movement of the de-bonding elements may be a resonant vibration of the de-bonding elements. The resonant movement may be a resonant vibration. The resonant frequency of vibration may correspond to the frequency of the respective energising signal.

The de-bonding elements may include one or more transducers arranged to move the de-bonding elements relative to the bonding region in response to the supply of the energising signal. The one or more transducers may include one or more piezoelectric transducers configured to be supplied with an electrical signal which is suitable for causing the one or more piezoelectric transducers to move, e.g. vibrate. The step of applying the energising signal to the bonding patch may include the step of supplying the transducers with a suitable electrical signal to cause movement of the transducers, e.g. vibration of the transducers. Where the electrical signal is supplied at a particular principal frequency, then the de-bonding elements may vibrate at the same principal frequency.

One or more respective transducers may be provided for each of the first and second groups of de-bonding elements. Accordingly, the transducer(s) provided in the first group of de-bonding elements may be suppliable with the first energising (electrical) signal e.g. via a first set of electrical contacts, and the transducer(s) provided in the second group of de-bonding elements may be suppliable with the second energising (electrical) signal e.g. via a respective second set of electrical contacts. The method may include the steps of sequentially, or simultaneously, supplying the transducer(s) provided in the first group of de-bonding elements with the first energising signal (e.g. via the first set of electrical contacts), and supplying transducer(s) provided in the second group of de-bonding elements with the second energising signal (e.g. via the second set of electrical contacts). The movement may be a vibration. The frequency of vibration may correspond to the frequency of the respective electrical signal. The frequency of vibration may match the frequency of the respective electrical signal.

In a fourth aspect there is provided a method of detaching a cladding body from a surface of gas turbine engine. The surface may be provided by a fan case of a gas turbine engine. The cladding body may be a liner panel of the fan case, for example a fan track liner or an impact liner. The bonding patch is provided as an intermediary bonding patch attached to the cladding body and bonded to the surface of the fan case.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
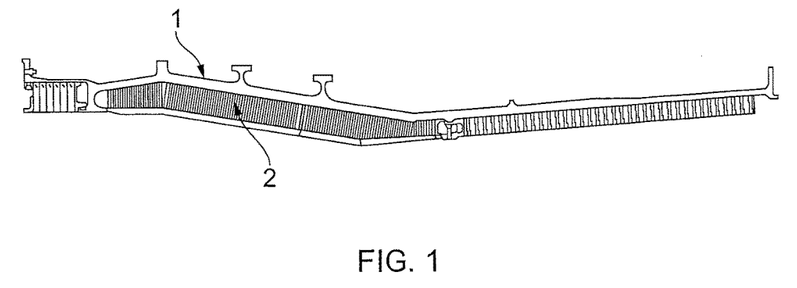
FIG. 1 shows a section of an upper region of a fan casing to illustrate the location of the fan track liner in a conventional gas turbine engine.

For illustrative purposes, FIG. 1 shows a section of an upper region of a fan case 1 suitable for use in a gas turbine engine, in which one or more liner panels 2 are bonded directly to the fan case 1. Liner panels 2 may be provided as impact liners, fan track liners etc.

As discussed above it can be a time consuming and delicate procedure to remove such a liner panel 2, or a section thereof, from the fan case 1 using conventional techniques.

Therefore, in an aspect, it is proposed to incorporate a bonding patch typically located (radially) between the liner panel 2 and the fan casing 1 to provide for easier and more efficient removal of the liner panel 2 from the fan case. The bonding patch may be bonded to the fan casing by means of an adhesive for example. The bonding patch may be attached to the liner panel by an adhesive or by other means such as mechanical fixings, for example bolts.

Figure 2:
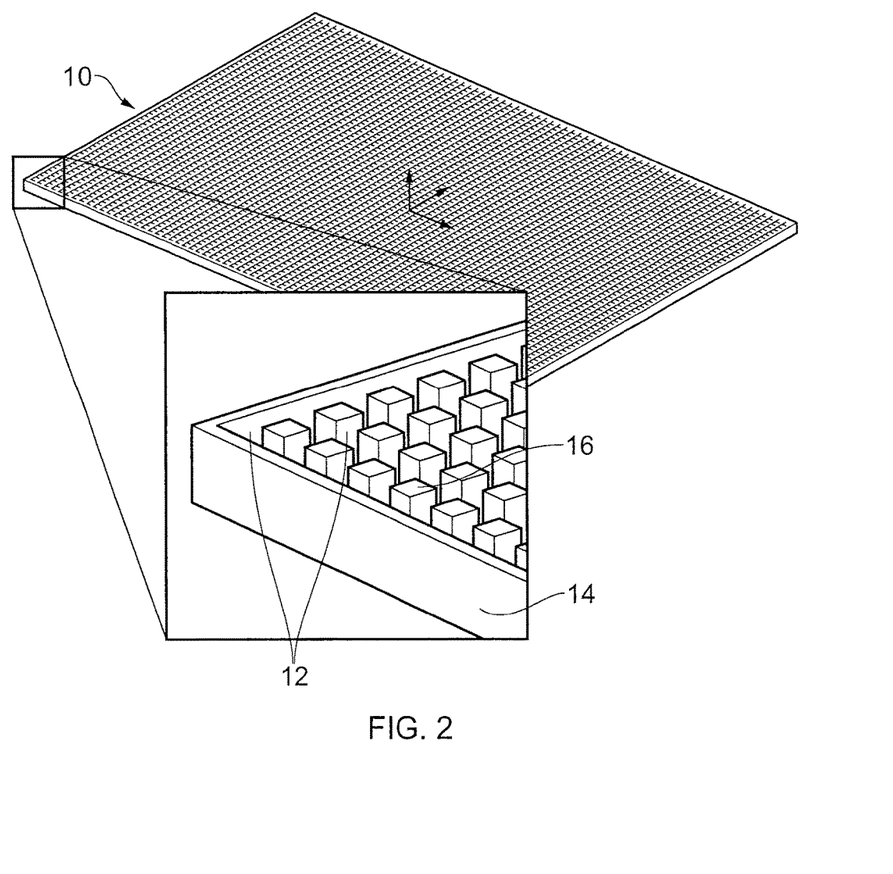
FIG. 2 shows a bonding patch.

An embodiment of a bonding patch 10 is shown in FIG. 2.

Bonding patch 10 defines a bonding region 12 for receiving an adhesive. The bonding region is typically at least partially defined by the inner face of a floor panel or member (not shown) of the patch 10. The bonding region may also be partially defined by wall members 14. Wall members 14 may be provided integrally with the floor member. Thus the floor and wall members may cooperate to define the bonding region for receiving the adhesive. In embodiments, the (inward facing surfaces, or faces, of the) wall members and the floor member cooperate to define a housing or reservoir region for containing the adhesive, for example.

Adhesive is typically introduced to the bonding region and the bonding patch is introduced to a suitable (bonding) surface, oriented so that the adhesive is brought into contact with the surface in order to bond together the bonding patch and the surface. The surface may be provided by a region, e.g. an internal region, of the aforementioned fan case for example.

By fixing a suitable liner panel 2 to the outwardly facing surface (or face) of the floor member, the liner panel can be attached to the bonding surface (of the fan casing) via the bonding patch.

Advantageously, a bonding patch provides de-bonding elements 16 for subsequent easy removal of the bonding patch and liner panel from the fan case.

In the example shown in FIG. 2, de-bonding elements 16 are shown as a regular array or grid of fingers or columns projecting from the floor member into the bonding region 12. Thus, in this example, when the bonding patch is bonded into place, the de-bonding elements 16 are arranged within an adhesive matrix bonding together the bonding patch and the aforementioned suitable surface. Advantageously, in this arrangement, the de-bonding elements 16 projecting into the adhesive increase the surface area provided by the bonding region for the adhesive. Therefore, the strength of the bond between the bonding patch and the surface is enhanced.

The de-bonding elements are configured to be movable in response to a suitable energising signal, e.g. a sound wave selected to result in sonic excitation of the de-bonding elements. In particular, in this particular embodiment, the de-bonding elements 16 are configured to be movable relative to the bonding region in response to sonic excitation.

The de-bonding elements may be configured to be vibratable in response to sonic excitation. For example, generating a suitable sound wave in the bonding patch, e.g. by applying a suitable sonic transducer to the bonding patch, at a particular principal frequency may result in vibration of the de-bonding elements at that principal frequency. By suitable selection of the frequency, the de-bonding elements can be tuned to vibrate at the optimum frequency for degrading the effectiveness of the adhesive. This may occur at the resonant vibrating frequency of the de-bonding elements for example.

The sonic excitation of the de-bonding elements can be achieved by use of a suitable sonic transducer, e.g. an ultrasonic transducer. For example, an ultrasonic transducer can be manually applied to the bonding patch, or even to the cladding member such as a fan track liner which is attached to the bonding patch, and a sound wave of a suitable frequency can thus be transmitted to (and generated in) the bonding patch.

In response to the application of such suitable sonic excitation, the de-bonding elements are induced to move, e.g. vibrate. Movement of the de-bonding elements 16 at a suitable frequency and amplitude degrades the effectiveness of the bond provided by the adhesive. For example, the compressive and shear forces introduced into the adhesive by the movement of the de-bonding elements effectively breaks up the glue bond provided by the adhesive. In particular, the structural integrity of the adhesive is typically compromised to such an extent that the strength of the bond provided by the adhesive is weakened to such a degree that the bonding patch can be readily de-bonded (detached) from the bonding surface.

Indeed, high frequency movement (e.g. vibrations) of the de-bonding elements induces localised stresses in the bondline (tensile, shear, compressive) which alternate in direction due to the nature of the vibrations. This typically results in a breakup of the bondline by some form of fracture (cohesive, interfacial, or fracture jumping between interfaces). Additionally, the vibration typically induces local heating through energy dissipation (much like for ultrasonic welding), which is likely to weaken the bond further.

Suitable selection of the sonic excitation can cause the de-bonding elements to move resonantly, for example. In particular, application of sonic excitation of a particular frequency may cause the de-bonding elements to move (to vibrate) resonantly. In other words, by suitable selection of the frequency of the sonic excitation it is possible to tune the amplitude of vibration (movement) to be a maximum e.g. at an optimum location on the de-bonding element.

In essence, the sound wave generated in the bonding patch can be thought of as an energising signal, in response to which the de-bonding elements are movable.

The patch may be formed of a metallic plate. However, the patch may be formed of a polymer, a plastic material, a composite or a ceramic.

The de-bonding elements 16 can therefore take the form of a patterned grid formed into the metallic plate. The patterned grid may be etched into the metallic plate for example. The patterned grid may be formed via electro chemical etching, by spark erosion and/or by (mechanical) milling of the surface to a specified depth.

In preferred embodiments, the patterned grid or array of de-bonding elements is provided in the form of an array of columns (e.g. square or circular in cross-section) projecting from the floor of the patch into the bonding region. The array of columns therefore on the one hand provides a greater surface area to which the adhesive is able to bond, and on the other hand provides a large surface area which can be moved, e.g. vibrated, to increase the likelihood of (structural) breakup of the adhesive, thereby allowing the bonding patch to be readily detached from the surface to, which it was bonded.

De-bonding elements 16 may be provided in the form of an array of columns have a uniform height, width, depth and grid density. Accordingly, the de-bonding elements may move or vibrate resonantly at a common (resonant) frequency, thereby helping the user to exert control over the frequency and amplitude of the movement (vibrations or oscillations) of the de-bonding elements 16.

Thus, in embodiments, the bonding patch may be detachable from the surface by sonic excitation of the de-bonding elements by use of a discrete and separate sonic transducer. The de-bonding elements may be configured to be movable in response to the ultrasonic excitation. Therefore, the transmitter or transducer may be an ultrasonic transmitter or transducer. This is discussed now with reference to FIG. 3, in which a specific example of removal of a liner panel 20 from a fan casing 24 is discussed, by de-bonding the intermediate bonding patch 22 is described.

Figure 3:
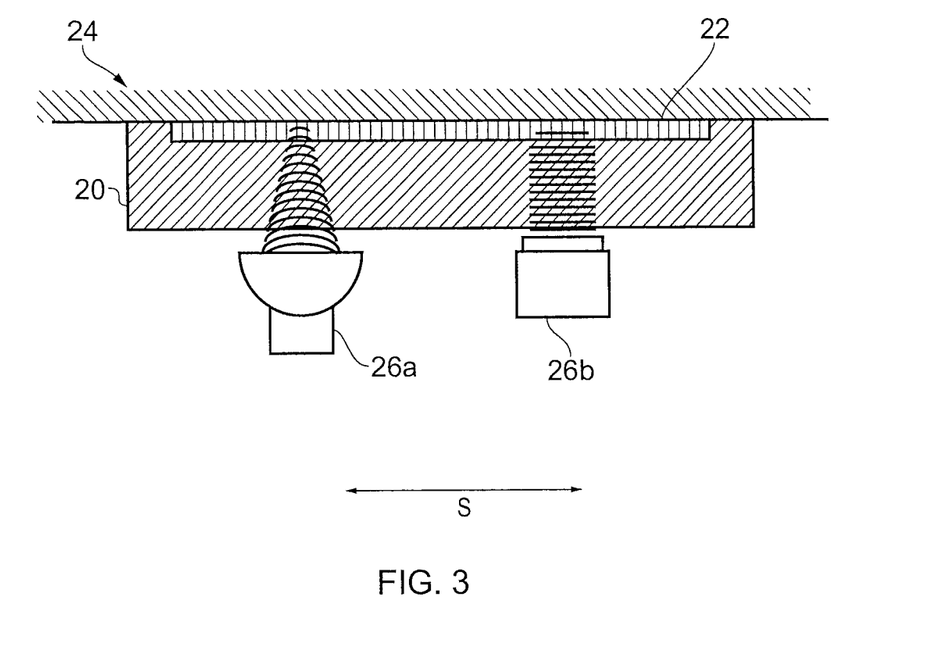
FIG. 3 shows the scanning of two respective types of ultrasonic transducer across the surface of a liner panel, the direction of the scanned motion indicated by arrow S, to de-bond the intermediary bonding patch from the fan case surface.

In FIG. 3, liner panel 20 is attached to bonding patch 22 to be coupled to fan case 24. Bonding patch 22 is bonded to fan case 20 by a suitable adhesive. For the sake of this discussion, the bonding patch 22 can be thought of as resembling the bonding patch shown in FIG. 2, and thus can be considered to have an array of de-bonding elements 16 in the form of columns, projecting into the adhesive from the floor member of the bonding patch. Thus, the adhesive may provide an adhesive matrix surrounding the respective de-bonding elements 16, to bond the bonding patch 22 to a suitable surface of the fan case 24.

Liner panel 20 may be formed to include a recess in which the bonding patch 22 is receivable. Liner panel 20 may be bonded to the outer surfaces of the bonding patch 22, or may be mechanically fixed, e.g. by nut and bolt, to the bonding patch 22.

Thus, as shown in FIG. 3, bonding patch 22 is bonded to bonding surface of fan case 24, and sits in a recess provided in liner panel 20 to be attached thereto.

To detach the bonding patch from the bonding surface of the fan case 24, an ultrasonic transducer 26 may be scanned over the surface of the liner panel 20, for example. This may be done manually. Different types of ultrasonic transducer may be used, for example a domed horn type ultrasonic transducer 26a or a piston source ultrasonic transducer 26b as shown in FIG. 3. Domed horn type ultrasonic transducer 26a and piston source ultrasonic transducer 26b typically produce differently shaped waveforms. However, the skilled person is aware of how to shape and focus these waveforms to achieve the desirable results in the light of the disclosure herein. Any other suitable waveguide, transducer or sonotrode could be used to introduce the energising signal into the bonding patch.

Figure 4:
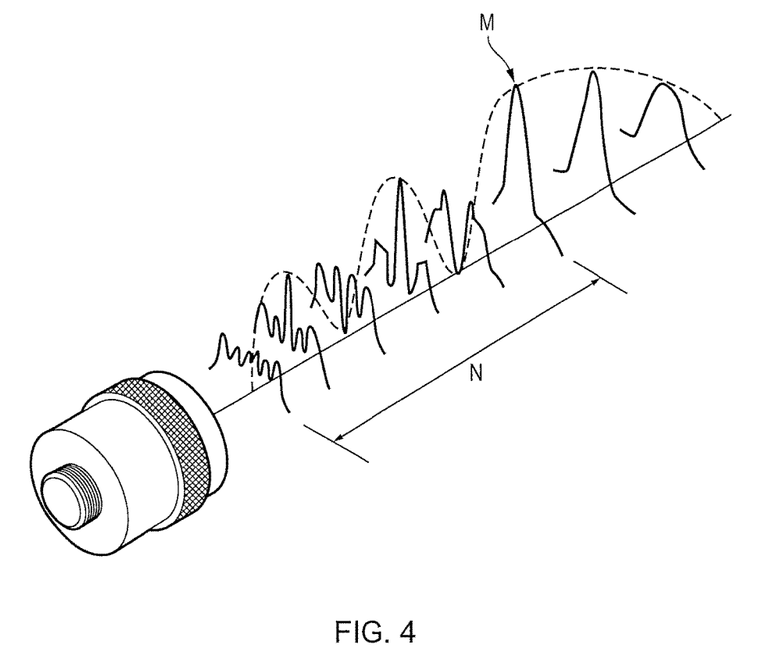
FIG. 4 shows a typical ultrasonic transducer, and the associated focussed output waveform, demonstrating that it is possible to tune the transducer to produce a focussed maximum in the de-bonding elements of the bonding patch.

In particular, as shown in FIG. 4, the ultrasonic energy from an ultrasonic transducer 28 can be focussed to a specific depth, by suitable adjustment of the domed horn or by a specifically tuned piston source transducer, where the far field maximum strength (M) of the beam is at the desired depth to cause the preferred movement or vibration of the de-bonding elements. Thus, it is possible to control the maximum movement, e.g. vibration, of the de-bonding elements to occur at a specific portion of the de-bonding elements.

The transducer is typically scanned manually across the panel at a slow rate causing the columns to vibrate resonantly and break up the adhesive bond via the compressive and shear forces generated. This vibration should cleanly de-bond the bonding patch locally from the bonding surface of the fan case, and allow the liner panel to be readily and cleanly detached from the fan case. Thus, minimum preparation of the fan case will also be required to fit a new panel e.g. via a new bonding patch.

The grid columns may vibrate as a vertical standing wave when exposed to the (ultra)sonic energy. They may be configured to provide no lateral motion at the base point when subject to the (ultra)sonic energy. In other words, the base point may be a node of zero amplitude vibration (movement).

This means that it is preferred that the height of the column should be a multiple of half the wavelength of the ultrasound to be utilised. So, for example, when using ultrasound from 20 kHz to 40 kHz the minimum length of the columns would be 4.3 mm to 8.6 mm (though the frequency may need to be higher depending on the glue used, therefore a shorter minimum length would be used).

In other embodiments, it may be preferred that the height of the column should be an odd multiple of one quarter of the wavelength of the ultrasound to be utilised. In this way, the distal end of a column in the grid can be energised to vibrate at a maximum. The distal end of the column can be considered to be the end of the column located distally to the floor of the patch, i.e. the end of the column which is distal to the base of the column.

Figure 6A:
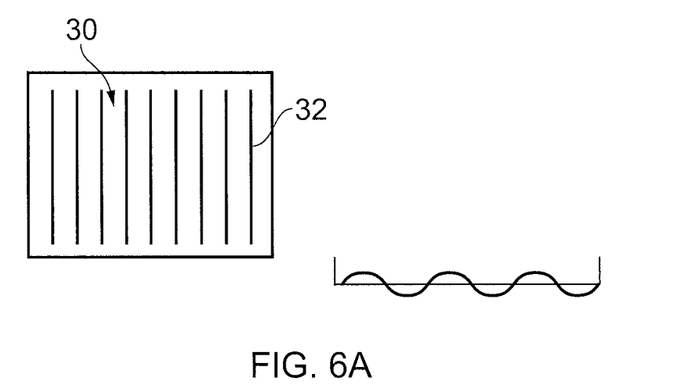
FIGS. 6A & 6B show respective further embodiments of a bonding patch, demonstrating alternative configurations and arrangements for the de-bonding elements.

In other embodiments, the de-bonding elements may not be provided as columns, but may be provided as ridges or ribbons 30, separated by slits or slots 32 in which the adhesive is receivable. This is shown in FIG. 6A for example. By suitable (ultra) sonic excitation of the ribbons 30, they can be made to vibrate to effect the same degradation and/or break-up of the adhesive as for the columns discussed above.

In a particularly advantageous arrangement, the ribbons 30 are configured to resonate (in response to sonic excitation at a suitable frequency and amplitude) as a standing wave and impart energy into the adhesive in the bond region, e.g. in order to break the bond line between the adhesive and the bonding patch. For example, they can be caused to vibrate horizontally with respect to the floor of the bonding patch with similar characteristics to the standing waveform shown in FIG. 6A. In this way the adhesive located in the slots 32 can be broken up by the vibration (movement) of the ribbons 32. By choosing a suitable height and width of both the ribbons 30 and the slots 32, a suitable resonant frequency can be established to maximise the efficacy of the break-up of the adhesive. In any event, the ribbons 30 are caused to move relative to the bonding region to break-up the adhesive and weaken the glue bond that it provides, thereby facilitating ready removal of the bonding patch from a surface to which it is bonded. Advantageously, this design requires relatively less space.

Figure 6B:
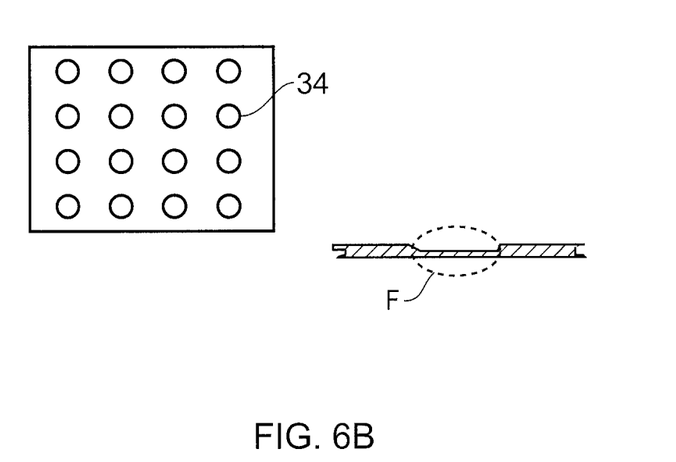

In yet another embodiment, the floor member of the bonding patch may be formed to include dimples 34, e.g. circular, rectilinear or square dimples, which are relatively thinner than the surrounding region of the floor member of the bonding, e.g. as shown in FIG. 6B. These dimples can be sonically excited to vibrate, e.g. like a drum skin, to move (or vibrate) relative to the bond region. For example, the fundamental mode (F) of a circular dimple energised by sonic excitation to vibrate according to a standing wave waveform is shown in FIG. 6B, in which the relatively thinner dimple is caused by sonic excitation of a suitable frequency to move relative to the bond region to break-up the adhesive and weaken the glue bond that it provides, thereby facilitating ready removal of the bonding patch from a surface to which it is bonded.

In other embodiments, electrically activated transducers may be incorporated into the bonding patch itself. This would eliminate the need to excite the de-bonding elements e.g. manually by scanning an ultrasonic transducer across the bonding patch.

Figure 5:
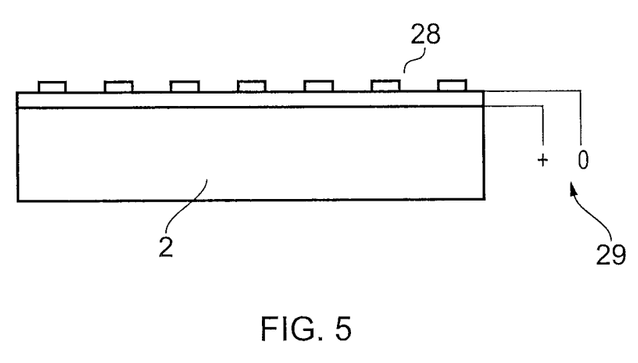
FIG. 5 shows an embodiment in which the de-bonding elements include transducers incorporated into the bonding patch.

The transducers may be supplied with a suitable electrical signal which causes them to move, e.g. vibrate, and interact directly with the adhesive to degrade it e.g. as discussed above. For example, piezoelectric transducers may be incorporated into the bonding patch as shown in FIG. 5. In this way, the de-bonding elements may include electrically activated transducers, e.g. piezoelectric transducers. Thus, the electrical signal for electrically activating the transducers can be thought of as an energising signal for moving the de-bonding elements.

In particular, supplying the transducers, e.g. the piezoelectric transducers, with an electrical signal at a particular principal frequency can result in vibration of the transducers at that principal frequency. By suitable selection of the frequency, the transducers can be tuned to vibrate at the optimum frequency for degrading the effectiveness of the adhesive. This may occur at the resonant vibrating frequency of the transducers for example.

Thus, the bonding panel can be made active rather than passive.

For example, electrical contacts could be embedded in the liner panel to provide an electrical connection to the piezoelectric transducers, so that the transducers can be activated as and when required.

Thus, when a liner panel needs removing from a fan case for example, a signal generator can be connected to the electrical contacts to supply a suitable electrical signal to cause movement, e.g. vibration, of the piezoelectric transducers. Advantageously, this provides fine control over the frequency of vibration of the de-bonding elements, so that the correct de-bonding frequency (i.e. the frequency required to activate the de-bonding elements) can be achieved easily.

The pattern/location of vibration across the entire panel (or a sub-region thereof) is controllable by arranging for the suitable distribution of the applied voltage to the various ultrasonic transducers elements provided as an array across the entire panel (or the sub-region thereof), for example by creating a program of sequential vibration patterns.

This embodiment is particularly safe as the electrically activated transducers would only be activated by application of a suitable electrical signal to the electrical contacts provided by the bonding patch. Thus, it would not be possible to accidentally de-bond the bonding patch from the fan case by activating the transducers via a sound wave generated in the bonding patch, for example transmitted from sound sources within the engine. Rather, the supply of a suitable electrical signal to the transducers would be required.

A particularly preferred embodiment is represented in FIG. 5, in which the piezoelectric elements 28 are provided by the bonding patch to be movable relative to the bonding region in response to the application, or supply, of a suitable electrical signal for example via electrical contacts 29.

In this embodiment, the piezoelectric elements 28 may form the de-bonding elements themselves. In other words, the piezoelectric elements 28 engage with the adhesive directly when moving (vibrating), thereby degrading the adhesive and facilitating breakdown of the adhesive bond line and allowing the bonding patch to be removed from the surface to which it was originally bonded.

For example, the piezoelectric elements 28 may be configured to be vibratable effectively to push against and/or withdraw from the adhesive in the bond region, by being oriented to extend and retract in suitable directions in response to an electrical signal. However, the piezoelectric elements 28 may be configured to be vibratable to extend and retract in parallel to the interface between the bonding patch and the adhesive in the bond region in response to a suitable electrical signal, thereby introducing a shearing force at the interface to weaken the effectiveness of the adhesive.

In yet another embodiment, a respective piezoelectric element may be incorporated into the bonding patch to be associated with each de-bonding element. Supplying the piezoelectric element with a suitable electrical signal results in the piezoelectric element providing the associated de-bonding element with a sound wave, for example, suitable to move the de-bonding element. However, a plurality of groups of de-bonding elements may be provided, and a respective piezoelectric element may be provided for each group of de-bonding elements.

The present disclosure is not limited to piezoelectric elements, any suitable (ultra)sonic transducer may be incorporated into the bonding patch.

Each (ultra)sonic transducer incorporated into the bonding patch may be configured to generate (ultra)sonic energy for resonantly moving (vibrating) the associated de-bonding element(s). In particular, in response to being supplied with a signal of a predetermined amplitude and frequency. Accordingly, in the case of piezoelectric transducers, it is possible to be certain that ultrasonic energy of a particular amplitude and frequency is delivered to the associated de-bonding element(s) by applying a voltage of a particular frequency and amplitude to the piezoelectric transducers.

An optional feature of the present embodiments ensures that a bonding patch does not de-bond unintentionally and accidentally during normal operation of the engine, e.g. by being accidentally exposed to suitable (ultra)sonic frequencies. For example, the bonding patch could be provided with discrete regions of de-bonding elements which move (vibrate), for example resonantly, in response to the application of respective energising signals at respectively different frequencies.

Therefore, for the bonding patch to be de-bonded from the surface to which it is bonded, it would require the application of the energising signals at the respective frequencies to the discrete groups, e.g. in a specific order or to a specific amplitude. For example, the application of only one energising signal at a particular frequency may de-bond one group of the bonding patch from the surface, but other group(s) would not be de-bonded. This optional feature therefore provides a safety lock feature. Each group may be provided in a respective region of the bonding patch. However, the respective groups may be spatially interspersed across the de-bonding patch.

This feature will be discussed with reference to the embodiment shown in FIG. 2, but is applicable to all other embodiments.

A bonding patch may have a plurality of respective groups of de-bonding elements. Each respective group of de-bonding elements may include one or more de-bonding element. In each group, the response to sonic excitation (the energising signal) of the de-bonding elements is the same. Whereas the response to sonic excitation of the de-bonding elements is different between the respective groups. For example, the resonant frequency (of vibration) of the de-bonding elements in each respective group is may be different to the resonant frequency (of vibration) of each of the other respective groups.

Figure 7:
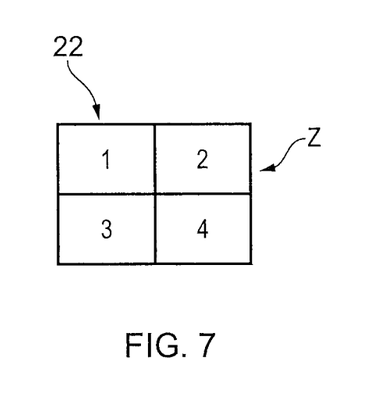
FIG. 7 shows an embodiment of a bonding patch, in which the bonding patch is sub-divided into regions having respectively different de-bonding elements, responsive to respectively different frequencies of sonic excitement, thereby providing a safety lock feature to the bonding patch.

An embodiment of this optional aspect of the disclosure is shown in FIG. 7 which shows that for a single bonding patch, the de-bonding elements may be provided in respective zones of the bonding patch to be mutually spatially exclusive. In the example shown, four groups of respectively different de-bonding elements are shown grouped into respective (mutually exclusive) zones 1-4 (Z1-4).

In this embodiment, the resonant frequency (of vibration) of the de-bonding elements in each respective zone is may be different to the resonant frequency (of vibration) of each of the other respective zones.

So, to de-bond the bonding patch in the region of zone 1, sonic excitation (an energising signal) of a first frequency may be used. However, the sonic excitation at the first frequency may not lead to de-bonding of zones 2-4 for example. Rather, zones 2, 3 and 4 are de-bonded by the application of sonic excitation at respectively different frequencies.

Thus, to de-bond the bonding patch shown in FIG. 7, zone 1 is subject to sonic excitation of a first frequency, zone 2 is subject to sonic excitation of a second frequency, zone 3 is subject to sonic excitation of a third frequency and zone 4 is subject to sonic excitation of a fourth frequency. Thereby, all the zones are caused to de-bond and the patch can be removed.

Thus, discrete regions of grids of de-bonding elements having respectively different resonant frequencies are able to provide a safety lock protecting against accidental de-bond of the bonding patch through accidental exposure to e.g. a single sonic frequency capable of de-bonding one of the grid regions during normal operation of the gas turbine engine.

This optional feature is particularly useful when applied to embodiments in which the de-bonding elements are movable in response to an energising signal in the form of a sound wave. However, it is also applicable to embodiments in which the de-bonding elements are movable in response to an energising signal in the form of an electrical signal. For example, a plurality of groups of piezoelectric transducers can be provided to be movable (vibratable), e.g. resonantly, in response to respective frequencies of electrical signal. Therefore, the common application of an electrical signal at a single frequency to all the transducers may result only in de-bonding of one particular group (e.g. zone, as described above) of the transducers, but may not result in de-bonding of the bonding patch.

In essence, any embodiments can be configured to include this safety locking feature, simply by providing respective groups of de-bonding elements have respectively different resonant frequencies of vibration. The principle applies equally to the columns, the ribbons, the dimples and all other variations of de-bonding element.

In the embodiments discussed herein, there are many variations to the grid pattern for the de-bonding elements, e.g. the grid density can be varied according to the adhesive used and the particular application, the grid may be an alternating pattern, it may be a graduating pattern, it may be a radial pattern, it may be a uniform pattern or a non-uniform pattern Where columns are used, the column shape itself could be e.g. rectangular, circular, conical, pyramidal, polygonal, solid or hollow. The columns could be of varying lengths.

The respective columns could vary within a single plane. The columns may each vary in shape along their respective length.

Instead of columns, the de-bonding elements could be provided as fins, continuous or patterns thereof.

Broadly, the present disclosure provides a patch fixed to a liner and bonded to a fan case by adhesive, wherein when exposed to suitable ultrasonic energy de-bonding elements of the patch resonate and break-up the bond line between the patch and the case, making for quick and easy removal of the attached liner.

In embodiments, a patterned grid of vertical columns are configured to vibrate (e.g. as a standing wave) at a specific frequency and amplitude, has a large surface area to improve the bond between the bonding patch and the surface to which it is bonded by the adhesive when static, and to improve bond break-up when caused to move or vibrate by sonic excitation.

In an aspect, which is combinable with any feature herein described, a bonding patch may comprise: a bonding region configured to receive an adhesive for bonding the patch to a surface; a plurality of de-bonding elements configured to be movable in response to an energising signal to degrade the effectiveness of the adhesive.

In an aspect, which is combinable with any feature(s) herein described, the present disclosure provides a bonding patch comprising: a bonding region configured to receive an adhesive for bonding the patch to a surface; a plurality of de-bonding elements configured to be movable in response to an energising signal to degrade the effectiveness of the adhesive.

In an aspect, which is combinable with any feature(s) herein described, the present disclosure provides a method of de-bonding a bonding patch from a surface, the bonding patch including a bonding region containing an adhesive bonding the patch to a surface, and a plurality of de-bonding elements configured to be movable in response to an energising signal (to degrade the effectiveness of the adhesive), the method including the steps of: applying the energising signal to the bonding patch to move the movable de-bonding elements thereby reducing the effectiveness of the adhesive; and removing the bonding patch from the surface.

The invention claimed is:

1. A gas turbine engine comprising:
   a casing;
   a bonding patch bonded to a surface of the casing; and
   a liner attached to the bonding patch, the bonding patch including:
      a bonding region configured to receive an adhesive for bonding the patch to a surface, the bonding region being at least partially defined by a floor of the patch; and
      a plurality of de-bonding elements projecting from a surface of the bonding region, the plurality of de-bonding elements being configured to be movable relative to the bonding region in response to receiving an energising signal, the plurality of de-bonding elements being configured to be embedded within the adhesive upon the adhesive being applied to the bonding region, the plurality of de-bonding elements being configured as an array of dimples formed in the floor to be thinner than a surrounding region of the floor, and to be movable relative to the bonding region in response to the energising signal.

2. The gas turbine engine according to claim 1, wherein the plurality of de-bonding elements are configured to vibrate in response to the energising signal.

3. The gas turbine engine according to claim 1, wherein the energising signal is an electrical signal or a sound wave.

4. The gas turbine engine according to claim 3, wherein a frequency of the energising signal is in an ultrasonic range.

5. The gas turbine engine according to claim 1, wherein the plurality of de-bonding elements include one or more transducers configured to be movable relative to the bonding region in response to the energising signal.

6. The gas turbine engine according to claim 5, wherein the one or more transducers includes one or more piezoelectric transducers configured to be receive an electrical signal causing the one or more piezoelectric transducers to move relative the bonding region.

7. The gas turbine engine according to claim 1, wherein:
   the plurality of de-bonding elements include a first group of de-bonding elements and a respective second group of de-bonding elements,
   the first group of de-bonding elements are configured to move resonantly in response to a first energising signal of a first frequency, and
   the second group of de-bonding are configured to move resonantly in response to a second energising signal at a respectively different second frequency.

8. The gas turbine engine according to claim 1, wherein the casing is a fan casing.

9. The gas turbine engine according to claim 1, wherein the liner is a fan track liner and/or an impact liner.

10. A method of de-bonding a bonding patch from a surface of a casing of a gas turbine engine, the bonding patch including a bonding region containing an adhesive bonding the patch to the surface, and a plurality of de-bonding elements projecting from a surface of the bonding region, the plurality of de-bonding elements being configured to be movable relative to the bonding region in response to receiving an energising signal, the plurality of de-bonding elements being configured to be embedded within the adhesive upon the adhesive being applied to the bonding region, the method comprising:
   applying the energising signal to the bonding patch to move the movable de-bonding elements relative to the bonding region, applying the energising signal including sub-steps of:
      applying a first energising signal to the bonding patch at a first frequency to move resonantly a first group of the de-bonding elements, and
      applying a respective second energising signal to the bonding patch at a respective second frequency to move resonantly a respective second group of the de-bonding elements; and
   removing the bonding patch from the surface of the casing of the gas turbine engine.

11. The method of de-bonding a bonding patch according to claim 10, wherein applying the energising signal to the bonding patch includes generating a sound wave in the bonding patch to move the movable de-bonding elements.

12. The method of de-bonding a bonding patch according to claim 10, wherein:
   the de-bonding elements include one or more transducers configured to be movable relative to the bonding region in response to the energising signal, and
   the method further comprises supplying the one or more transducers with a suitable electrical energising signal to move the transducers relative to the bonding region.

13. The method of de-bonding a bonding patch according to claim 12, wherein the one or more transducers are piezoelectric transducers.

14. The method of de-bonding a bonding patch according to claim 10, wherein the de-bonding elements are configured to vibrate in response to the energising signal.

15. The method of de-bonding a bonding patch according to claim 10, wherein the surface of the casing is provided by a fan casing of the gas turbine engine, and the bonding patch is further attached to a fan track liner and/or impact liner to bond the fan track liner and/or impact liner to the fan casing.

* * * * *